US006980924B2

(12) United States Patent
Lunenburg et al.

(10) Patent No.: US 6,980,924 B2
(45) Date of Patent: Dec. 27, 2005

(54) WEIGHING SYSTEMS

(75) Inventors: Pieter Cornelis Lunenburg, Auckland (NZ); Lawrence Frederick Blount, Auckland (NZ)

(73) Assignee: Tru-Test Limited, (NZ)

( * ) Notice: Subject to any disclaimer, the term of this patent is extended or adjusted under 35 U.S.C. 154(b) by 0 days.

(21) Appl. No.: 10/741,631

(22) Filed: Dec. 18, 2003

(65) Prior Publication Data

US 2004/0133385 A1 Jul. 8, 2004

(30) Foreign Application Priority Data

Dec. 20, 2002 (NZ) .................................. 523290

(51) Int. Cl.[7] ........................ G01G 11/00; G01G 19/22
(52) U.S. Cl. .................... 702/173; 177/25.13
(58) Field of Search ................... 702/173, 113, 115; 177/25.11, 25.12, 25.13, 199

(56) References Cited

U.S. PATENT DOCUMENTS 6,781,067 B2 * 8/2004 Montagnino et al. ..... 177/25.13

* cited by examiner

*Primary Examiner*—John Barlow
*Assistant Examiner*—Meagan S Walling
(74) *Attorney, Agent, or Firm*—Blakely Sokoloff Taylor & Zafman

(57) ABSTRACT

Weighing apparatus, which includes one or more loadbars 11 and a weight indicator 10. Communication between the loadbars 11 and the indicator 10 is via a wireless communication. The indicator 10 includes a receiver 12 and data from the loadbar 11 is transmitted to the receiver 12 via transmitter 24. A sealed power source module 16 is connected to the loadbars 11 or one power source module 16 is connected to each loadbar 11. The transmitter 24 can be incorporated in the power source 16.

26 Claims, 2 Drawing Sheets

WEIGHING SYSTEMS

BACKGROUND OF THE INVENTION

This invention relates to improvements in weighing systems and in one particular form a cordless electronic weighing system.

Most industrial and commercial electronic weighing systems make use of one or more load cells connected to an indicator or scale. A commonly used term is loadbar, which refers to that part of the weighing system, which receives at least part of the load that is to be weighed (e.g. by means of force, displacement or other measurable quantity) and which contains the transducer, or load cell, to convert that quantity into an electrical signal. A loadbar may contain one or several load cells. Typically 2 loadbars are placed under a platform to make a complete load receptor. A platform with load cells mounted under it should be considered equivalent to (typically) a pair of loadbars for the purpose of this patent.

Sometimes the load cell(s) is/are included inside the indicator, but in many applications the load cells are located in loadbars that are physically separate from the indicator. The loadbars are then connected to the indicator using electrical cables. Typically, these cables provide electrical power to the transducer (and optional other electronic circuits) inside the loadbars, and transfer the signal produced by the transducer (or optional electronic circuits) to the indicator of the weighing system.

In many industrial and agricultural applications for weighing scales the cables connecting the loadbars to the indicator have to be protected to avoid being damaged. Alternatively, mechanically robust cables can be used to withstand a certain amount of rough handling or abuse. When a loadbar cable is damaged the system is temporarily out of action until the cable (which is often part of the loadbar assembly and cannot be separated) is repaired or the assembly is replaced. This can be inconvenient, time consuming and expensive.

The amount of damage to a loadbar cable to make a system unusable is often quite small. It does not necessarily mean that one or more conductors in the cable are severed or shorted. Even just a small break in the insulation jacket of the cable can have a sufficient effect on the accuracy of a weighing system. The reason for this is that the load cells in many loadbars are based on the use of resistive strain-gauges, which produce relatively small signals (in the order of a few millivolts or less, full scale) and have a relatively high source impedance (typically in the order of a few hundred ohms). In such a system based on resistive strain gauges, if a break in the loadbar cable insulation jacket allows a small amount of moisture to enter the cable and make some electrical contact between wires inside the cable, or to work its way down the cable and into the load cell, accuracy is often affected to the point where cable repairs are necessary to restore weighing system performance to an acceptable level.

Weighing systems employing loadbars and a remotely located indicator are often used in unfriendly environments. One example is animal farming which is very inhospitable for electronic devices due to, amongst other things water, dung, urine and sharp hooves.

Therefore, in such an environment, and taking into account the strong possibility of cable damage, the occurrence of damage creates significant problems for the farmer. For example, damage is usually noticed when the farmer intends to start weighing. Consequently stock will usually be in the yards and a stock truck may be present. Thus there is considerable user inconvenience, not to mention frustration and expense, to cancel a day or a weeks work to get the scales repaired.

Diagnosis of cable damage faults can be difficult for the farmer. For this reason a fault may not be noticed until after erroneous weighing results have occurred. This can be another source of expense to the farmer as the farmer is often effectively paid by weight.

A further source of expense to the farmer is the cost of repair. A cable must be repaired professionally to prevent future moisture ingress. Moisture that has entered through the cable damage can travel inside along the cable and get into load cells.

Thus in set-up the farmer needs to ideally route the cables where they will not get damaged easily. This is often not possible or easy to achieve. Also positioning of the indicator is relevant and may have some bearing on cable routing.

The present invention is not limited to weighing equipment based on the use of resistive strain gauges. The invention is applicable to other types of systems, which normally employ electrical wires between the loadbars (or, more generally speaking, the transducers therein) and the indicator.

SUMMARY OF THE INVENTION

It is an object of the present invention to provide improvements to a weighing system so that the system and/or operator is no longer seriously affected by damage to cables between the loadbars and the indicator.

According to the present invention, this objective can be met by providing a weighing system, which is not adversely affected by apparently "superficial" damage to the cables or a system, which does not rely on cables between the loadbars and the indicator. The objective can also be achieved by improving the robustness of a weighing system so as to enable the end user to make simple repairs to the cable when it has been damaged in order that the system can continue to be used without suffering unacceptable loss of accuracy, until such time as a more permanent repair can be made.

Broadly in one aspect the present invention therefore provides weighing apparatus which includes one or more loadbars and a weight indicator, the weighing apparatus being characterised in that communication between the loadbar(s) and the indicator is via cable-less signals.

DETAILED DESCRIPTION OF THE PREFERRED EMBODIMENTS OF THE INVENTION

Figure 1:
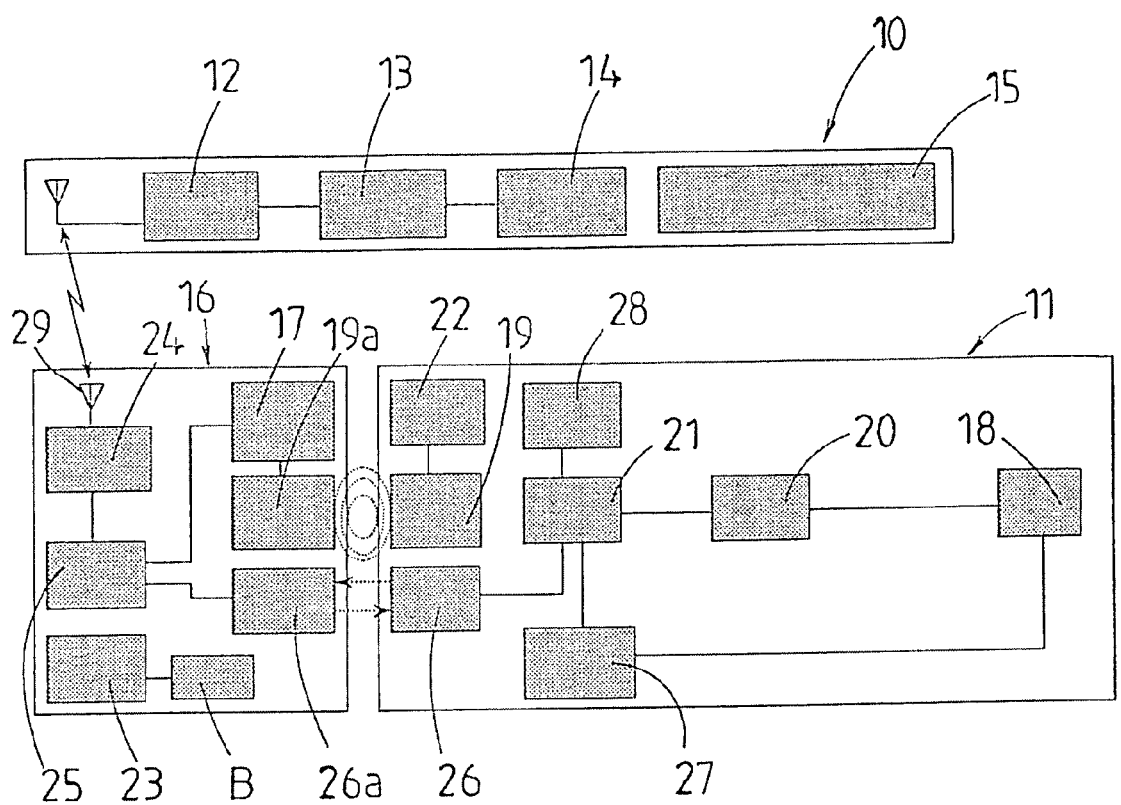
FIG. 1 is a block diagram of an indicator and loadbar combination incorporating the present invention.

To more fully describe the invention reference will now be made to various embodiments of the invention in the following more detailed description.

In order to increase the robustness of the electronic weighing system, one important form of the present invention provides for an increase in the signal strength of the transducer output signal on the conductors in the cable.

Preferably at the same time the output impedance of the signal source connected to the cable is reduced. To achieve this a signal amplifier is mounted inside or near to the loadbar. The function of the amplifier is to provide signals of a greater magnitude to the loadbar cable and a lower source impedance than the transducer itself provides.

An electronic weighing system incorporating this arrangement minimises the influence of small amounts of damage to the cable on the accuracy of the weighing system, even though it does not entirely eliminate the problem. It depends on the severity of the damage and on the required resolution of the weighing system as to how much deterioration of the signal can be tolerated before repairs are necessary.

To completely eliminate the problem of gradual deterioration of the signal from the transducer due to damaged cables it is possible to convert the analog signal from a transducer into a digital signal or encoded digital signal. This can be carried out either inside or near to the loadbar. The cable from the loadbar to the indicator then carries a digital signal.

An alternative method is to convert the analog signal to a signal of variable frequency. The indicator thus receives the variable frequency signal, which can easily be converted into a digital signal by the indicator with minimal loss of resolution.

While both of these methods will provide for complete elimination of the problem of gradual loss of accuracy that the simple more direct transducer/signal and amplified transducer/signal method (disclosed above) suffers when the cable is damaged, severe damage to the cable (shorted or open circuit wires) will still make repairs necessary.

A direct benefit of the analog signal conversion, whether it be via a signal of variable frequency or a simple or encoded digital signal, is that high accuracy can be achieved using a small number of conductors in the cable. The most accurate systems where the signals from the strain gauge(s) configured in a full bridge (or parallel bridges) are carried directly on the wires in the cable, is one where a cable with six conductors is employed. A loadbar with equal accuracy, but a digital output signal instead of a direct transducer signal would require a minimum of only three conductors. This would reduce the cost of the cable and the connectors or alternatively more rugged types of cables and connectors could be used without leading to unacceptable increases in costs. It would generally be the case that each wire is indicated by say colour coding so that the non-skilled repairer can ensure that the correct wires are reconnected.

Extending the foregoing further some degree of improvement in ruggedness can be achieved by including a circuit inside the loadbar that enables the same set of wires that provide electrical power to the loadbar transducer and electronic circuits to carry the (processed version of) loadbar output signal as well. A matching electronic circuit inside the indicator can then separate the loadbar signal from the AC or DC power supply signal for further processing.

The number of conductors in the loadbar cable can thus be reduced to only two. Such a cable would typically include or at least use only two wires (conductors) and would be round or preferably flat 'figure of eight' form. When such a two-wire cable is damaged it will often be a simple matter of making repairs quickly and at minimal cost to the user of the weighing system.

The circuitry would preferably be designed to allow the wires to be swapped without affecting the performance of the weighing system (so that a non-skilled repairer can easily repair the wires). Alternatively, the wires could be identified by say colour coding so that the repairer can ensure that the correct wires are reconnected.

Manufacturers often employ expensive 'waterproof' connectors between the loadbar cables and the indicator of such a weighing system to protect against the above mentioned loss of weighing accuracy caused by undesirable (parasitic) conduction between the conductors in a conventional loadbar cable or connector (typically as a result of moisture ingress).

The waterproofness of these connectors is sometimes enhanced further against moisture ingress in higher humidity environments by the encapsulation of otherwise internally exposed electrical connections, using an insulating compound. If the mating parts of these 'waterproof' connectors on loadbar cable and indicator are left exposed when disconnected from each other, moisture can also accrue on otherwise insulating surfaces between contacts (e.g. by condensation, immersion or splashing) and result in loss of accuracy when the connectors are reconnected for operation of the weighing system.

A benefit of transmitting a signal of variable frequency or a simple or encoded digital signal along cables between loadbars and indicator is that relatively inexpensive multiple contact connectors or individual wire connection terminals can be employed rather than more expensive 'waterproof' connectors, since the signal integrity is not degraded appreciably by presence of moisture between the conductors or contacts.

A further benefit of the three or (particularly) the two wire concept disclosed above is that regular connection and disconnection of cables to the indicator using an inexpensive screw connection terminal for each wire becomes a practical option.

In situations where cables are prone to suffer severe damage (shorted or open circuit wires) it is, therefore, proposed to eliminate the loadbar cable entirely. This can be achieved by transmitting the signal from the loadbar to the indicator via a radio signal (electromagnetic waves). Alternatively optical means (e.g. infra red light) or acoustical means (e.g. ultrasonic sound) are possibilities. These, however, are lesser attractive for economic and/or engineering reasons. Irrespective of the means of transmitting the signal from the loadbar the weighing system indicator will incorporate an appropriate receiver to detect the signal transmitted by the loadbars.

It is, therefore, proposed that the preferred method is to use radio signals, as this is believed to be superior in reliability over optical and acoustical means. This is principally because radio frequency signals readily penetrate through many materials (dirt, muck, plastics, etc.) whereas optical and acoustical transducers are easily clogged/obscured. Furthermore, it is easier to obtain communication over longer distances using radio signals compared to optical or acoustical means, given the same amount of electrical power for transmission purposes.

While the weighing system can be based on one loadbar it is also often the case that the indicator is connected to more than one loadbar. The more common systems use one, two or four loadbars with relatively few systems having more than four loadbars per indicator.

Because there is often more than one loadbar transmitting information to the indicator by means of radio signals a signal from one loadbar could potentially "obscure" or corrupt a signal from another loadbar when the two loadbars transmit signals simultaneously (i.e. data collision).

According to the present invention, different methods of overcoming data collision problems are proposed.

According to one form of the invention time division multiplexing can be employed. In such an arrangement each loadbar in the weighing system transmits information during pre-determined time-intervals (time slots). Each loadbar thus "knows" when it is due to transmit information, since each loadbar in the system has a separate time slot. In this way data collisions are avoided provided that the time slot of one loadbar does not overlap with the time slot of another loadbar.

With such an arrangement it is necessary to synchronise the loadbars with each other so that data transmissions remain separated in time for the duration that the weighing system is in use. As the proposal calls for the loadbar to be cable-less (cordless, wireless) they will generally not have any interconnecting wires to other loadbars. However, as interconnecting wires will not necessarily be as exposed as a cable between the loadbars and the indicator, the use of such interconnecting wires for the purpose of synchronisation and possibly for the sharing of power source and amalgamation of signals from the loadbars cannot be discounted for the purposes of achieving the present invention.

According to one practical arrangement, synchronisation is achieved by each loadbar being equipped with a radio receiver. Synchronising signals can be received by the receivers in, on or adjacent to the loadbars so that each loadbar can make a decision which time slot can be utilised for its data transmissions, thereby avoiding data collisions. The provision of a receiver circuit in each loadbar, however, increases the complexity and costs of the loadbar, which could lead to such an arrangement being less cost effective in the context of commercial competition.

A further embodiment of the present invention is thus to use frequency division multiplexing. In such an arrangement each loadbar in the weighing system transmits information on a unique frequency (channel). Each load bar will know its own channel and will have full continuous use of that channel. With such an arrangement the loadbars in the system will each have a separate channel so that data collisions are avoided. Thus each loadbar can transmit its information regularly or continuously on its predetermined frequency channel.

Such an arrangement does not have the problem of synchronisation as with the previously disclosed time division multiplexing. However, a problem does arise as to how to ensure that each loadbar in the weighing system occupies a unique frequency channel. A solution to this problem is to again provide a receiver in the loadbar so that the loadbar can make a decision as to which channel is free for data transmission. Yet again this solution may not be preferred for the reasons of costs and complexity.

Therefore, a possible solution is to build or program the loadbars so that each will occupy a particular predetermined frequency channel. Selection of the channel can be done either during manufacture of the load bar or by the user (e.g. by means of switch settings) prior to use of the loadbar.

It is believed that the latter will be the preferred arrangement because the user who wishes to replace a loadbar, for whatever reason, can set the frequency channel to that of the loadbar being replaced. Therefore, the user will only need to keep one spare loadbar whereas with manufacturer determined channel settings the user would need to keep one spare for every loadbar in the weighing system.

A drawback with providing user-programmability is that of moisture ingress into externally accessible switches.

In a situation where the loadbars receive the required electrical power from a replaceable battery pack external to the loadbar, the battery pack could include a means of setting the loadbar frequency channel. This in itself would lead to a further problem in that battery packs could not be freely swapped. Such swapping of battery packs can typically occur when an empty battery pack is replaced with a fully charged pack.

Therefore, a further embodiment of the invention is to have each loadbar in the weighing system transmit its information regularly and on the same frequency, but each transmission is kept very short in duration with the transmissions occurring at random times. On a longer time scale, transmissions are still performed at a predetermined rate, but on a short time scale they occur at random times.

This proposal does not avoid data collisions but rather seeks to minimise the occurrence of data collisions. If transmissions are made regularly enough and the frequency of data collisions is low enough, a sufficient amount of data can still be received from each loadbar to ensure proper operation of the weighing system.

A drawback with this proposal is that, to be effective in keeping the collisions infrequent, the data transmissions need to be kept as short as possible with a maximum amount of time between transmissions. The available bandwidth of the data transmission system (transmitter, receiver, processing units) is consequently used in an inefficient manner since data is actually transmitted at most for a few percent of the total available time. On the other hand, this transmission method means that all loadbars can be manufactured exactly the same and there is no need for means to provide for selecting of a frequency channel.

Yet a further embodiment of the invention is to have each loadbar in the weighing system transmit information on one frequency band, but using a modulation technique that evenly "spreads" the transmitted energy over a relatively wide range of frequencies. This technique can be achieved by "frequency hopping spread spectrum" or a "direct sequence spread spectrum". In either case a binary "pseudo random noise sequence" is used to spread the energy over the frequency band so that for normal receivers the energy appears to be random noise. A specially constructed receiver with knowledge of the exact random noise sequence is able to recover the transmitted data from the signal.

Consequently more than one loadbar can transmit information on the same frequency band simultaneously without causing data collisions, as long as each loadbar in the system employs a different "pseudo random noise sequence". This arrangement, therefore, does not require the loadbars to be synchronised as to data transmissions nor is a receiver needed in the loadbars. If the loadbars make use of a "pseudo random noise sequence" with adequate length (the number, of binary bits in the sequence), then a multitude of different pseudo random noise sequences is available. Each pseudo random noise sequence used in the loadbars can be given an identification number.

At manufacture, therefore, the loadbars can be programmed with a particular pseudo random noise sequence. When the loadbar is used in the weighing system the user can enter the identification number of the pseudo random noise sequence, so that the indicator knows which particular sequence a particular loadbar is using. Therefore, the indicator will know which loadbar is sending the information.

In the embodiments of the invention which are cable-less an electrical power source will need to be placed either inside or directly adjacent to or in the vicinity of the loadbar. The most common power source will be a battery, which can either be rechargeable or non-rechargeable. When non-rechargeable a method to permit battery replacement will need to be provided and will need to be one, which is convenient to the user. For example, in many weighing systems loadbars are mounted in such a way that they are relatively inaccessible, e.g. underneath a weighing platform. If the loadbar includes a battery compartment that needs to be opened to replace a battery or battery pack, then this could be an awkward operation for the user of the weighing system. A number of different embodiments are contemplated by the present invention.

In the following description of these the term "battery" is used to cover power sources consisting of a single cell, multiple cells, multiple cells combined into a battery pack, and may or may not include a housing for added user convenience and/or for enhanced protection of the cells.

According to one embodiment the loadbar housing has a removable section that can be opened by the user to gain access to the battery. This, however, is a less preferred embodiment as access could make the arrangement less than user friendly.

According to a second embodiment, therefore, the battery is enclosed in a housing attached to the loadbar in a very simple and quick operation. This will go some way to overcoming the accessibility problem associated with having the battery located within the loadbar housing. However, once again, in some weighing systems the loadbars may be installed in areas that are accessible only after a considerable effort (e.g. removing panels from a cattle or sheep race etc.).

Accordingly, in a third embodiment it is proposed that the clip-on battery will not be installed directly on the loadbar itself but somewhere in the vicinity of the loadbar where it is convenient to not only achieve the clip-on function, but also render the battery easily accessible to the user.

While this arrangement will require that the battery be connected to the loadbar by means of electrical cable, the cable can nevertheless be tucked away from ready access and, therefore, possible damage. In the event that it is damaged, this cable which would typically include or at least use only two wires (conductors) and would be of round or flat 'figure of eight' form would be simple to repair. Additionally it would generally be the case that each wire in the cable is indicated by say colour coding so that the non-skilled repairer can ensure that the correct wires are reconnected.

Despite the attractiveness of the arrangement whereby the battery is clipped-on to the loadbar or to an interface remote from the loadbar but connected to it via a cable, such an arrangement could pose an additional problem especially when one of the goals is to make the weighing system of improved ruggedness. Accordingly, the clip-on battery itself and its interface with the loadbar must be rugged in order to achieve this goal. Making highly reliable electrical contacts can create problems, especially in corrosive or other adverse environments.

According to an embodiment of the invention, it is, therefore, proposed that energy be transferred from the battery to the loadbar circuits without using electrical contacts. Contactless energy transfer can be achieved in a number of ways, but the most suitable means for transfer across very small distances (e.g. less than 10 mm) is to use inductive power transfer. In addition, a battery charger for recharging the battery could also be arranged by the same inductive power transfer elements, therefore, making it possible to incorporate in the weighing system a truly sealed battery without any exposed electrical contacts.

Any cable-less or wireless communication method will lead to certain limitations as to the maximum number of loadbars in a weighing system. However, it is anticipated that the maximum possible number of cable-less loadbars per indicator is very likely to be significantly higher than in a fully wired system where limitations arise from a number of cables and connectors that can be accommodated by the weight indicator.

In the majority of practical implementations of loadbars with built-in signal processing circuits (cable-less loadbars or otherwise), the processing circuit will contain a microcontroller. At the time of manufacture the microcontroller must be programmed with the software to perform the functions for proper operation of the loadbar. At the same time, the microcontroller memory can be programmed with information about the calibration of the loadbar, it's date of manufacture, a serial number, the type of loadbar, the maximum loading of the loadbar and other useful information.

Alternatively, some or all of this information can be stored in a simple memory device included in or attached to the loadbar and which is interrogated by the microcontroller in the indicator. This information is then directly available to the indicator.

This is all particularly useful when commissioning a weighing system and during service of a weighing system. Traditional loadbars without a programmable memory lack this capability or at best implement a very limited version. For example, it is common that the type of loadbar be electrically communicated, often by means of one or two resistors.

FIG. 1 illustrates the basic form of an embodiment of the wireless indicator system.

The indicator 10 is essentially a ruggedised microcomputer with associated peripherals. Data from the loadbar 11 is communicated via the transceiver 12 and interpreted by the microcomputer 13. Mass and other data is displayed via display 14 for the operator. The indicator 10 may be powered by an internal battery 15 or from an external power source.

Figure 2:
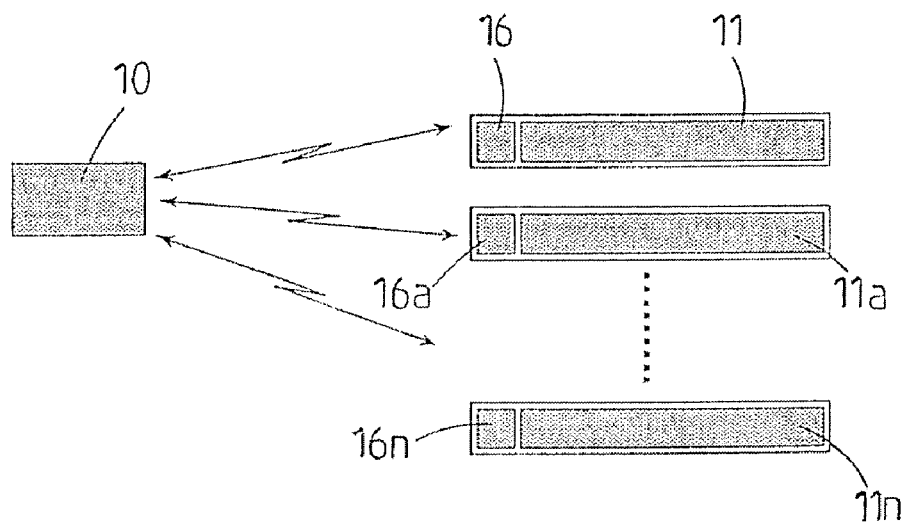
FIG. 2 is a diagram showing an indicator and plurality of loadbars in accordance with the invention.

One indicator 10 may be associated with between one and eight (nominal) loadbar-battery pack pairs 11, 16—see FIG. 2. Each loadbar 11 requires its own battery pack 16. The battery pack 16 and loadbar 11 are separate units one possible configuration requires them to be housed in the same enclosure when in use. Other possible configurations allow for a single power supply and transmitter/transceiver to be associated with several loadbars connected together via cables, the communications with the indicator 10 would still be wireless however.

Power for all circuitry within each loadbar-battery pack pair 11, 16 are sourced from a typically single battery within the battery pack. As described previously, power can be transferred to the loadbar 11 via inductive coupling or corrosion resistant electrical contact methods. FIG. 1 illustrates the inductive coupling method.

Control of the inductive power transfer may either be open or closed loop. Closed loop control requires an effective means of transferring a signal from the loadbar 11 to the battery pack 16 to determine the output of the power transfer controller 17.

As the loadbars may often be in locations that are difficult to access, one requirement is that the battery within each battery pack 16 lasts an acceptably long time. One way to achieve this is to have a high capacity battery, the other is to minimise the power requirements of the electronic circuitry and transmitter. One possible method of reducing power requirements is the use of a discontinuous power supply to certain parts of the circuit, for example the strain bridges 18. This could be when there is no significant signal output change from the loadbars.

The battery pack 16 will typically contain a single "D" size alkaline cell i.e. a common battery. Alkaline cells have a long shelf life, high energy density and relatively low cost compared to other readily available cells. All circuitry will typically run from a voltage between 2.0V and 3.0V. The useable voltage is constrained by the operating voltage of readily available integrated circuits and the need to reduce power losses.

The power supply in the battery pack will comprise a boost-type switching regulator (not shown) designed to boost the nominal 1.5V of the D-cell to the required 2.0–3.0V for the circuitry. While the D-cell voltage may drop below 1.0V on discharge, the switching regulator will maintain the correct voltage to run the circuitry.

Power received by the power transfer coil 19 in the loadbar will be filtered and voltage regulated by means of a low-dropout voltage linear-type regulator. A low dropout linear regulator reduces the complexity and power loss.

Each loadbar 11 contains it's own analogue to digital converter (ADC) chip 20 to convert analogue signals from the strain bridges 18 to digital data that can be interpreted by the micro-controller units (MCUs) 21. Usually only one ADC chip 20 is employed in a conventional scale system where the loadbar(s) are connected to indicator via cables. This ADC is housed within the indicator.

Optionally loadbar end error correction can be achieved digitally by digitizing and adjusting the signals from each end of the loadbar respectively.

The strain bridges 18 must be located at the ends of the loadbar 11 for mechanical reasons. The electrical connection point between the heavy cable and the light wiring to the strain bridges is typically mid way along the loadbar in conventional cabled systems. It is likely that the ADC circuitry 20 will reside in this mid-way location in the wireless loadbar system of the present invention.

The power transfer circuitry within the loadbar 11 must be adjacent to the battery pack 16 as the magnetic path length between the two coils 19 and 19a must be very short. The remainder of the circuitry within the loadbar 11, apart from the ADC 20 and the strain bridges 18, would be contained on the same printed circuit board as the power supply 22.

It is preferred that mechanical on/off switching of the power supply 23 in the battery pack 16 be avoided due to environmental sealing difficulties, degradation of moving parts, inaccessibility, and to relieve the operator of the task of turning the device on and off. The proposed method is for the receiver/transceiver 24 in the battery pack 16 to turn on periodically for a very short time to check if the indicator 10 is requesting communication. If no communication is requested, the device "goes to sleep" again until it is due to check for communications. This cycle will continue indefinitely until the indicator 10 does request communications.

When in the "sleep" or quiescent state, the power drain from the battery B is extremely low thus enabling the battery pack 16 to stay in this state for prolonged periods. If the indicator 10 requests information, the battery pack circuitry "wakes up" completely and also begins providing power to the loadbar 11. Communication between the battery pack 16 and loadbar 11 is enabled as well as two way wireless communication with the indicator 10. This does not preclude the use of mechanical switching devices such as magnetically operated reed switches, for example.

Both the battery pack 16 and the loadbar 11 are "intelligent" devices due the use of micro-controller unit (MCU) devices 25 and 21 respectively. These MCUs can be used for control, communication, signal processing, and diagnostic purposes.

Diagnostic data can be relayed to the indicator 10 from the battery pack 16 and the loadbar 11. This information may in-turn be relayed to the indicator display 14 to prompt operator intervention or may be used directly by the electronics for control purposes The MCU 21 in the loadbar 11 preferably must either contain EEPROM memory (or flash memory or other non-volatile memory) or have an ancillary EEPROM chip for the purpose of storing calibration and serial number data for the loadbar. Storing this information in the loadbar enables battery packs 16 to be interchanged at will. Digital calibration data enables the loadbar 11 to be calibrated electronically, eliminating the requirement for manually fitted calibration resistors. The loadbar serial number will be a unique identifier for communication to and from the indicator 10.

The loadbar MCU 21 will read data from the ADC circuit 20, digitally filter it, and then process it as necessary. The processed data will then be fed into the communication circuitry 26, 26a for transmission to the indicator 10.

The strain bridges 18 normally require calibration to adjust the output to zero, for zero applied mass, and to adjust the gain of the bridge. This is normally effected by the use of calibration resistors manually soldered into each loadbar circuit. The proposed system can optionally automate this calibration by storing zero and gain data, as determined by a calibration apparatus, in the non-volatile memory within the loadbar. The requirement for the addition of resistors would be removed. The zero offset circuit 27 in the loadbar 11 can provide "zero" compensation based on the stored correction values. Loadbar end-error correction could also be included in the design.

Significant errors in weight readings can be produced by the change in mechanical properties of the loadbar 11 due to temperature variations. Normally these errors are reduced in an analogue fashion by the use of temperature compensation resistors. The proposed system can optionally utilise a temperature sensor device 28 attached to the loadbar MCU 21 enabling errors to be compensated for in firmware.

Figure 3:
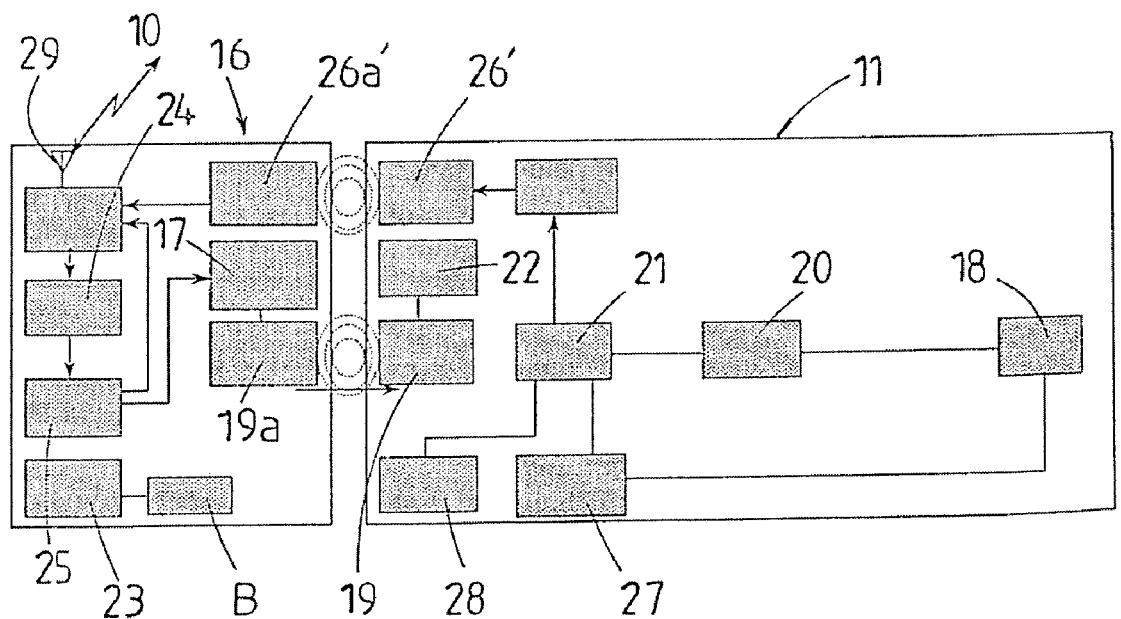
FIG. 3 is a further block diagram similar to FIG. 1 but showing a further embodiment of the invention.

Communications between the loadbar 11 and the indicator 10 will be by means of a wireless radio link. FIG. 1 illustrates a radio transceiver (transmitter and receiver) in both the indicator 10 and the battery pack 16. Another configuration would be to place a receiver in the battery pack and a transmitter in the loadbar 11 (See FIG. 3). The purpose of this second configuration would be as an alternative means of transferring data from the loadbar 11 through to the antenna 29 in the battery pack 16.

Two-way communication between the loadbar 11 and the battery pack 16 can be by a variety of means including, but not limited to:

A two-way infra-red link

Data from the loadbar 11 to the battery pack 16 via infrared and data from the battery pack to the loadbar by modulation of the power transfer flux.

Data from the loadbar MCU 21 being fed directly into a transmitter section then being fed via inductive transfer to the antenna 29 in the battery pack. Data from the battery pack to the loadbar would be transferred via modulation of the power transfer flux, as above. See FIG. 3.

A corrosion resistant contact system.

The radio transmitter links will be low power (less than 5 mW power output) as a data communication range of less than ten metres is required and battery life is a prime consideration. The actual range attained will vary in each location as it will somewhat dependant upon interference from surrounding objects and other radio frequency devices.

The frequency of operation will lie within one of the unlicensed bands and may vary from country to country.

The efficiency of data transmission is largely a function of the antenna design.

Digital data transmission may employ, but not be limited to frequency shift keying (FSK), amplitude shift keying (ASK) or spread spectrum techniques.

The cordless weighing system according to the present invention includes features, which can be summed up as:
1. Cable free and sealed. Elimination of cables between the loadbar 11 and indicator 10 combined with fully sealed electronics make the system suitable for use in harsh environments.
2. Ease of battery replacement. A removable sealed battery pack 16 enables the battery to be changed in a benign environment.
3. Low Power Consumption. Circuitry used is designed for low current drain in order to extend battery life. Low power consumption combined with the use of readily available batteries provides convenience and low cost operation for the user, (possible PWM control of power supply to high load circuits eg. load cell).
4. Contactless power transfer. Contactless power transfer from the battery pack 16 to the loadbar 11 eliminates problems with dirty contacts, corrosion and environmental sealing. Inductive transfer is only one possible embodiment. Capacitive transfer maybe suitable. Provision can be allowed for a corrosion resistant contact based system eg. high frequency AC (minimises electrochemical corrosion), sealing around contacts and/or large corrosion resistant contacts eg. stainless steel.
5. Contactless communication. Contactless communication between the battery pack 16 and the loadbar 11 again eliminates problems with dirty contacts, corrosion and environmental sealing.
6. Electronic switch on circuitry. The on/off circuitry in the battery pack 16 and the loadbar 11 will preferably contain no moving parts. This means that these units can be fully sealed against the environment and are not limited by mechanical switch degradation. The proposed method is for the battery pack circuitry to periodically poll for communication requests from the Indicator. The presence or absence of such a request will determine if the Battery pack circuitry "wakes up" or not. The quiescent power consumption of the battery pack will be minimised to extend battery life.

The present invention thus seeks to provide a weighing system of improved ruggedness and/or user serviceability with the preferred forms of the invention achieving this objective by use of wireless or cable-less arrangements.

What is claimed is:

1. Weighing apparatus which includes at least one loadbar, a weight indicator and wherein communication between the at least one loadbar and the weight indicator is via cable-less signals, the apparatus further including a self contained power source connected by inductive power transfer means to or near each said loadbar and the power source is a substantially effectively environmentally sealed module.

2. Weighing apparatus which includes at least two loadbars, a weight indicator and wherein communication between at least one of the loadbars and the weight indicator is via cable-less signals, the apparatus further including a self contained power source connected by inductive power transfer means to a first one of said loadbars and said first one of said loadbars is hand wire connected to at least one of said second loadbars and the power source is a substantially effectively environmentally sealed module.

3. Weighing apparatus as claimed in claim 1 or 2, wherein the power source includes a receiver and a control circuit the power source receiver being controllable by the control circuit to turn on periodically for a period of time to determine if a communication request is being transmitted from a transmitter of the indicator.

4. Weighing apparatus as claimed in claim 3 wherein the power source includes at least one common dry battery.

5. Weighing apparatus as claimed in claim 3 wherein the power source further includes a transmitter and a wireless communication means for communication of data between the power source and the loadbar.

6. Weighing apparatus as claimed in claim 5 wherein the communication means is a two-way infrared link.

7. Weighing apparatus as claimed in claim 5 wherein the communication means is an infrared link for communication from the loadbar to the power source and modulation of power transfer flux from the power source to loadbar.

8. Weighing apparatus as claimed in claim 5 wherein the communication means is an inductive link for communication from the loadbar to the power source and modulation of power transfer flux from the power source to loadbar.

9. Weighing apparatus as claimed in claim 8 wherein the power source is connectable to the charger through sealed corrosion resistant contacts.

10. Weighing apparatus as claimed in claim 3 wherein the loadbar includes a control circuit which has an EEPROM memory or other non-volatile memory arranged to store digital calibration data and serial number data for the loadbar.

11. Weighing apparatus as claimed in claim 10 wherein the loadbar includes an analogue to digital converter coupling load cells of the loadbar to the loadbar control circuit.

12. Weighing apparatus as claimed in claim 11 further including a temperature sensor device operatively connected to the loadbar control circuit.

13. Weighing apparatus as claimed in claim 3 wherein the power source further includes a transmitter and a corrosion resistant contact system for communication of data between the power source and loadbar.

14. Weighing apparatus as claimed in claim 3 wherein the communication means comprises means for feeding data from a transmitter associated with the loadbar to antenna of the power source and means for feeding data from the power source to the loadbar by modulation of the power transfer flux.

15. Weighing apparatus as claimed in claim 3 wherein the power source includes at least one rechargeable battery, the power source being connectable to a charger by inductive power transfer means.

16. Weighing apparatus as claimed in claim 3 wherein the loadbar includes shut down means to enable periodic shutdown of power to parts of it's circuit during periods of inactivity.

17. Weighing apparatus as claimed in claim 1 or 2 wherein the power source includes an environmentally appropriate on/off switch.

18. Weighing apparatus as claimed in claim 17 wherein the on/off switch is a magnetically operable reed switch.

19. Weighing apparatus which includes a plurality of loadbars, a weight indicator, cable-less communication between the loadbars and the weight indicator, the cable-less communication being via radio frequency signals and one or more transmitters associated with the loadbars, the transmitters arranged to transmit on one frequency band using a frequency hopping spread spectrum or direct sequence spread spectrum technique and wherein a pseudo random noise sequence is employed to spread transmitted energy over said frequency bands, each loadbar employing a different pseudo random noise sequence.

20. Weighing apparatus as claimed in claim 19 wherein each loadbar is programmed such that the pseudo random noise sequence is given an identification number.

21. Weighing apparatus which includes a plurality of loadbars and a weight indicator, wherein communication between the loadbars and the weight indicator is via cable-less signals and wherein each loadbar has associated therewith a transmitter arranged to transmit on the same radio frequency at random times and for a very short duration to minimize data collisions.

22. Weighing apparatus which includes a plurality of loadbars and a weight indicator, wherein communication between the loadbars and the weight indicator is via cable-less signals and wherein the loadbars are associated with transmitters arranged to transmit radio signals at pre-determined time intervals by time or frequency division multiplexing.

23. Weighing apparatus as claimed in claim 22 wherein the loadbars each includes a radio receiver for receiving synchronising signals.

24. Weighing apparatus as claimed in claim 22 further including on each loadbar means for adjustment of the frequency channel.

25. Weighing apparatus which includes at least one loadbar, a weight indicator, a self contained power source connected by inductive power transfer means to or near each loadbar and wherein communication between the at least one loadbar and the weight indicator is via cable-less signals.

26. Weighing apparatus which includes at least two loadbars, a weight indicator and wherein communication between the at least one loadbar and the weight indicator is via cable-less signals, the apparatus further including a self contained power source connected by inductive power transfer means to a first one of said loadbars and said first one of said loadbars is hard wire connected to at least a second one of said loadbars.

* * * * *